(12) United States Patent
Hatfield

(10) Patent No.: US 6,957,515 B1
(45) Date of Patent: Oct. 25, 2005

(54) DEVICE FOR HOLDING A WORKPIECE ADJACENT A CEILING SUPPORT

(76) Inventor: Mark D. Hatfield, 1556 Larchwood Dr., Dayton, OH (US) 45432

( * ) Notice: Subject to any disclaimer, the term of this patent is extended or adjusted under 35 U.S.C. 154(b) by 56 days.

(21) Appl. No.: 10/388,877

(22) Filed: Mar. 14, 2003

(51) Int. Cl.$^7$ .................. E04G 21/04; F16M 13/00
(52) U.S. Cl. ............. 52/127.2; 52/749.1; 248/354.3
(58) Field of Search ................... 52/127.2, 749.1; 414/11; 248/229.2, 229.25, 200.1, 216.1, 248/217.4, 298.1, 316.8, 354.1, 354.3

(56) References Cited

U.S. PATENT DOCUMENTS

| | | | |
|---|---|---|---|
| 2,725,210 A * | 11/1955 | Swartz ................... 248/354.3 |
| 2,778,556 A * | 1/1957 | Johnson ..................... 182/206 |
| 3,030,061 A * | 4/1962 | Jennings ................. 248/354.3 |
| 4,089,141 A | 5/1978 | Heroux |
| 4,254,945 A | 3/1981 | Paulson et al. |
| 4,270,721 A * | 6/1981 | Mainor, Jr. ............. 248/285.1 |
| 4,304,078 A * | 12/1981 | Meriwether, Jr. ......... 52/127.2 |
| 4,314,429 A | 2/1982 | Casteel et al. |
| 4,449,338 A | 5/1984 | Reicherts |
| 4,460,147 A | 7/1984 | Macbain |
| 4,518,141 A * | 5/1985 | Parkin ....................... 248/546 |
| 4,564,182 A | 1/1986 | Svajgl |
| 4,709,460 A | 12/1987 | Luhowyj |
| 4,709,527 A | 12/1987 | Cooley |
| 4,717,101 A | 1/1988 | Harrod |
| 4,742,981 A * | 5/1988 | Converse ............... 248/231.71 |
| 4,775,056 A * | 10/1988 | Inglis ...................... 211/105.3 |
| 4,782,642 A | 11/1988 | Conville |
| 4,868,943 A | 9/1989 | Robichaud |
| 5,163,799 A * | 11/1992 | Lynn .......................... 414/11 |
| 5,224,309 A | 7/1993 | Bodell |
| 5,303,894 A * | 4/1994 | Deschamps et al. ........ 248/343 |
| 5,371,994 A | 12/1994 | Waters |
| 5,407,183 A | 4/1995 | Singeltary |
| 5,564,236 A | 10/1996 | McKinney et al. |
| 5,655,337 A * | 8/1997 | Bryant et al. .............. 52/127.2 |
| D392,543 S | 3/1998 | Pratico, Jr. |
| 5,884,447 A | 3/1999 | Earp |
| 6,082,945 A | 7/2000 | Jeffries et al. |
| 6,155,019 A * | 12/2000 | Ashton et al. ............. 52/739.1 |
| 6,402,096 B1 | 6/2002 | Ismert et al. |

* cited by examiner

Primary Examiner—Anita M. King
(74) Attorney, Agent, or Firm—R. William Graham

(57) ABSTRACT

A device for holding a work piece over head, wherein the device is employed between a first wall support and a second wall support and the wall support are interconnected to support a ceiling support, which includes a first removable support connector for connecting the device to the first wall support, a first cross member hingedly connected to the first removable support connector at one end and having another end which is elongated and includes an inwardly extending opening thereby forming a female end, a second removable support connector for connecting the device to the second wall support generally opposing the first wall support, and a second cross member connected hingedly connected to the first removable support connector at one end and having another elongated male end which is of a size and configuration to be slidably received within the female end.

10 Claims, 2 Drawing Sheets

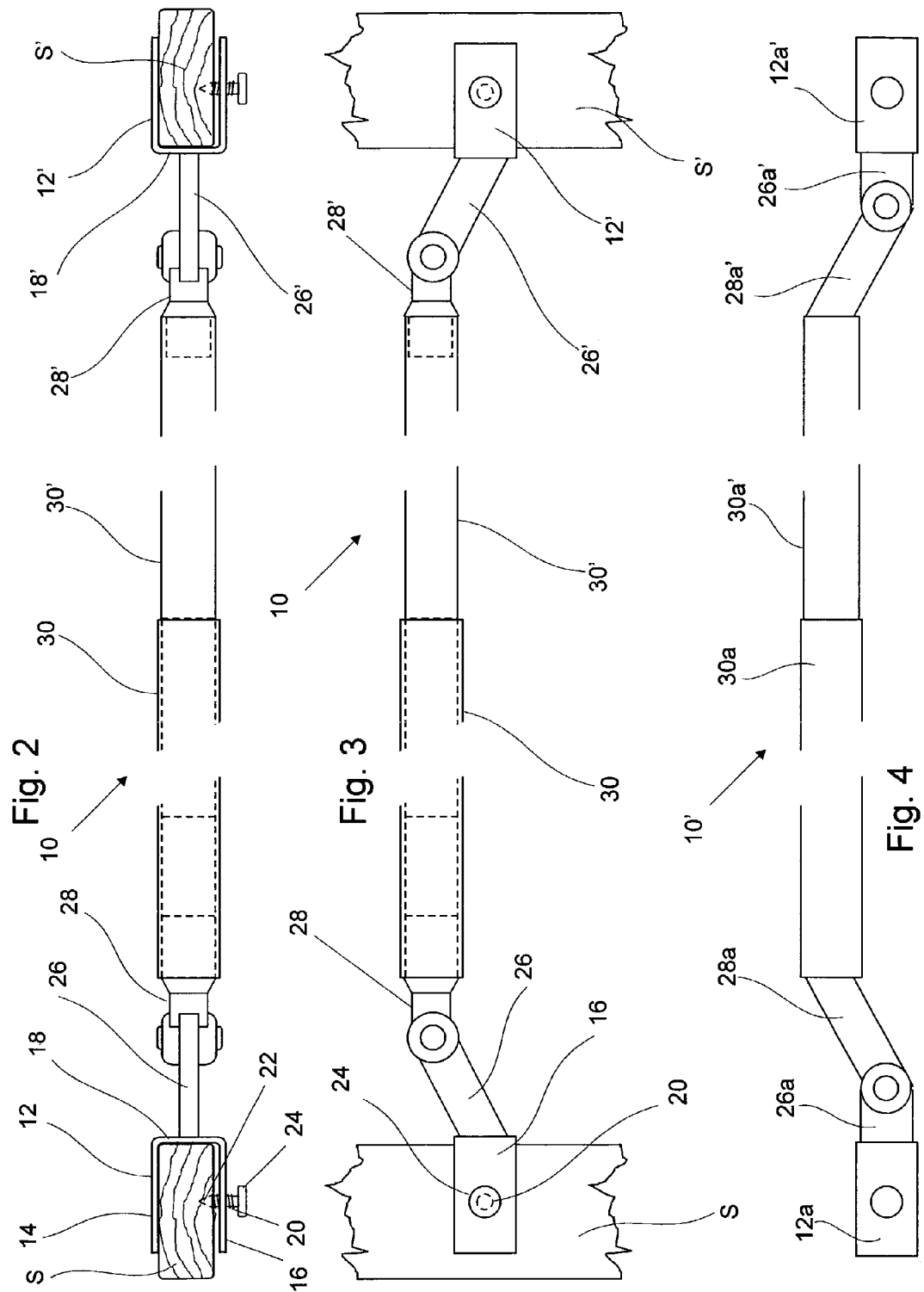

DEVICE FOR HOLDING A WORKPIECE ADJACENT A CEILING SUPPORT

BACKGROUND OF THE INVENTION

1. Field of the Invention

The present invention relates to devices for holding a work piece adjacent a ceiling. More particularly, the present invention relates to a device for holding a ceiling panel, plumbing pipe, or electrical conduit adjacent a ceiling support to enable the installation thereof.

2. Description of the Prior Art

Suffice to say that interior wall and ceiling panel construction involves use of materials such as "sheet rock" or "drywall," which is commonly used material for indoor walls and ceilings. Anyone who has worked with these materials knows the panel weight is significant and can quickly wear a person out in installing the same.

The installation of panel materials as a ceiling surface is a most strenuous exercise even with several people helping. In the case of one person installing drywall to the ceiling, it can be an exhausting process and requires a supporting tool.

Typically, one or more workers manually lift the panels of sheet material into an intended overhead placement location, and then hold the sheet material in place, while other workers secure the sheet material to its support structure, typically using fasteners such as screws. This process is labor-intensive, and poses a risk of injury to the workers involved.

This has led to the development of a number of lifting and retaining devices. For example, various braces have been made which typically consist of a support pole having a platform connected to one end which maintains the drywall to an overhead position once it has been raised for connection. The brace can include compression spring to further aid in supporting an overhead panel.

Still others have employed expensive and cumbersome pneumatic lifts to aid in the raising and holding of drywall. Others have actually gone so far as to adapt a body worn support device to aid in the holding of drywall.

The prior art has yet to provide a suitable device for aiding in holding drywall to a ceiling which can be easily utilized by one or more workers with minimal strain. The present invention overcomes the deficiencies in the art, i.e., it is relatively simple to operate and inexpensive. Further, the need exists for a simple device for assisting in elevating and retaining in place large work pieces during overhead construction without substantially interfering with the work area below.

SUMMARY OF THE INVENTION

It is an object to provide a light weight and structurally strong support capable of supporting and holding various building materials in place to facilitate fastening the same to building structures.

It is another object to provide a device for holding a work piece adjacent a ceiling which is quick and easy to employ.

It is yet another object to provide device for holding a work piece adjacent a ceiling joist in a manner which does not interfere with the work and floor space below.

Accordingly, the invention is directed to a device for holding a work piece over head, wherein the device is employed between a first wall support member and a second support wall member and the wall support members are interconnected to support a ceiling support member. The device includes a first removable support connector for connecting the device to the first wall support member wherein the first removable support connector has two opposing arms for slidably receiving the first wall support member therebetween and having means connected to at least one of the arms for removably lockingly engaging the first wall support member upon being so received between the arms, a first cross member hingedly connected to the first removable support connector at one end and having another end which is elongated and includes an inwardly extending opening thereby forming a female end, a second removable support connector for connecting the device to the second wall support member generally opposing the first wall support member wherein the second removable support connector has two opposing arms for slidably receiving the second wall support member therebetween and having means connected to at least one of the arms for removably lockingly engaging the second wall support member upon being so received between the arms, and a second cross member hingedly connected to the second removable support connector at one end and having another elongated male end which is of a size and configuration to be slidably received within the female end.

The objects and advantages of the present invention are to provide a wide range of operational capabilities and improvements over the above mentioned prior art. Once devices of the invention are deployed, a work piece, e.g., HVAC conduit, can be easily slid onto the device where it is maintained in position and ready for attachment and can remain in position for use in installing another work piece, e.g., Sheet Rock. Still further objects and advantages will become apparent from a consideration of the ensuing description and drawings.

The features of the invention believed to be patentable are set forth with particularity in the appended claims. The invention itself, however, both as to organization and method of operation, together with further objects and advantages thereof, may be best understood by reference to the following description taken in conjunction with the accompanying drawings.

BRIEF DESCRIPTION OF THE DRAWINGS

FIG. 2 is a top view of an embodiment of a device for holding a work piece adjacent a ceiling in accordance with the principles of the present invention.

FIG. 3 is a side view of the embodiment of FIG. 2.

FIG. 4 is a side view of an embodiment of a device for holding a work piece adjacent a ceiling in accordance with the principles of the present invention.

DETAILED DESCRIPTION OF A PREFERRED EMBODIMENT

Figure 1:
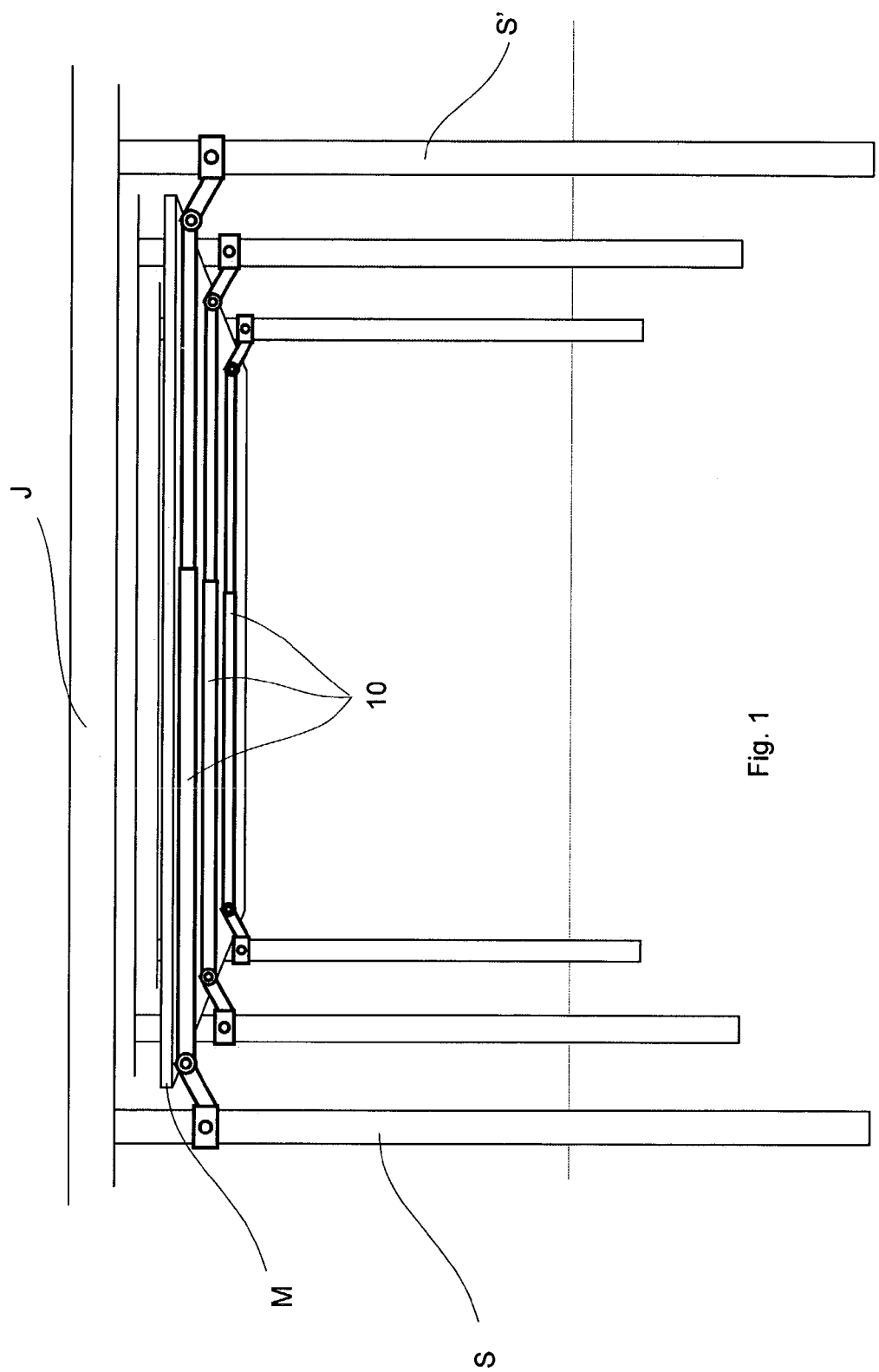
FIG. 1 is a schematic perspective view of a device for holding a work piece adjacent a ceiling as deployed in accordance with the principles of the present invention.

While this invention is susceptible of embodiment in many different forms, there is shown in the drawings, and will herein be described in detail, exemplary embodiments, with the understanding that the present disclosure is to be considered as illustrative of the principles of the invention and not intended to limit the invention to the exemplary embodiments shown and described.

Referring now to the drawings, the device for holding a work piece adjacent a ceiling is generally designated by the numerals 10 and 10'. As seen in FIG. 1, there are a plurality of the devices 10 deployed.

FIGS. 2 and 3 show an embodiment of the device 10. At each end of the device 10, there is a generally U-shaped bracket 12, 12'. Bracket 12 has two sides (arms) 14 and 16 which are connected by a transverse member 18. The shape of the U-shaped bracket 12 is generally configured to receive a wall stud S, e.g., a 2×4, as depicted in FIGS. 1 and 2. However, it is contemplated that other configurations of the bracket may be employed to carry out the intent of the invention and the claims appended hereto should not necessarily be limited to the particular configuration. On the other hand, the particular configuration provides a preferred design is believed novel for use in the invention. Bracket 12' is similarly formed to bracket 12.

Side 16 includes an open surface 20, which can be threaded, to receive a threaded screw 22 having a knob 24. When the bracket 12 receives the stud S, as seen in FIGS. 1 and 2, the knob 24 can be used to threadably turn the screw 22 into locking engagement with the stud S. Thus, the screw 22 provides a way to fixably position the bracket 12 to the stud S.

Connected to the transverse member 18 is a laterally extending member 26 which in FIG. 3 is shown as angled upward from the bracket 12 and is hingedly connected at another end to a cross member 28. Cross member 28 has a female end 30 including an axial opening extending therethrough.

Connected to a transverse member 18' is a laterally extending member 26' which in FIG. 3 is shown as angled upward from bracket 12' and is hingedly connected at another end to a cross member 28'. Cross member 28' has a male end 30' which is of a size to be slidably received within the axial opening of end 30.

FIG. 4 depicts another embodiment wherein laterally extending members 26a and 26a' extend generally horizontally with respect to brackets 12a and 12a' and the cross members 28a and 28a' are angled upwardly. The male end 30a' and female end 30a are connected to cross members 28a and 28a', respectively, at an angle and are intended to be disposed parallel to ceiling joist J (e.g., FIG. 1) and above brackets 12a and 12a' and are similarly operable.

In practicing use of the invention, a plurality of the devices 10 are used and are laterally spaced from each other to be attached to opposing spaced wall studs S and S' which have been previously constructed to support ceiling joists J. Depending upon the work piece size, the number and spacing of the devices 10 can be varied to fit the need. For example, a sheet of Sheet Rock material M may require two or more devices 10 which are laterally spaced a distance less than the length of the Sheet Rock material M.

One bracket 12 is attached to a stud S at a predetermined desired height and then the other bracket 12' is attached to an opposing stud S' at an equal height in a manner to provide sufficient spacing and clearance between the joist J and cross members 28 and 28'. Thus, the cross members 28 and 28' are generally parallel and spaced with respect to the joists J.

It is contemplated that the device 10, 10' can be made to accommodate different sized room widths. For example, cross members 28 and 28' can be of a suitable length adjustment, e.g., 8 feet. Together with the other components, the device 10 can telescope to expand to a variety of the lengths, e.g., 12 ft. or 16 ft.

While details of the invention are discussed herein with reference to some specific examples to which the principles of the present invention can be applied, the applicability of the invention to other devices and equivalent components thereof will become readily apparent to those of skill in the art. Accordingly, it is intended that all such alternatives, modifications, permutations, and variations to the exemplary embodiments can be made without departing from the scope and spirit of the present invention.

What is claimed is:

1. A device for holding a work piece over head, wherein the device is employed between a first wall support member and a second wall support member and the wall support members are interconnected to support a ceiling support member, which includes:
   a first removable support connector connecting said device to the first wall support member;
   a first cross member connected to said first removable support connector at one end and having another end which is elongated and includes an inwardly extending opening thereby forming a female end;
   a second removable support connector for connecting said device to the second wall support member generally opposing the first wall support member; and
   a second cross member connected to said second removable support connector at one end and having another elongated male end which is of a size and configuration to be slidably received within said female end, wherein when said device is connected to the wall support members, said cross members are connected in a manner to remain in a fixed spaced relation with respect to the ceiling support member and said support connectors are disposed below said cross members, wherein said cross members include a downwardly extending angled portion which is fixed to said support connectors.

2. The device of claim 1, wherein said support connectors are generally U-shaped brackets.

3. The device of claim 2, said brackets are positioned longitudinally on each of the wall support members.

4. The device of claim 1, wherein when the device is employed to the wall support members, said cross members are generally parallel to the ceiling support member.

5. The device of claim 1, wherein said first cross member is hingedly connected to said first removable support connector at said one end and said second cross member is hingedly connected to said second removable support connector at one end.

6. A device for holding a work piece over head, wherein the device is employed between a first wall support member and a second wall support member and the wall support members are interconnected to support a ceiling support member, which includes:
   a first removable support connector connecting said device to the first wall support member;
   a first cross member connected to said first removable support connector at one end and having another end which is elongated and includes an inwardly extending opening thereby forming a female end;
   a second removable support connector for connecting said device to the second wall support member generally opposing the first wall support member; and
   a second cross member connected to said second removable support connector at one end and having another elongated male end which is of a size and configuration to be slidably received within said female ends, wherein when said device is connected to the wall support members, said cross members are connected in a manner to remain in a fixed spaced relation with respect to the ceiling support member and said support connectors are disposed below said cross members, wherein said support connectors include upwardly extending an angled portion fixed thereto and which connects to said cross members.

7. The device of claim 6, wherein said support connectors are generally U-shaped brackets.

8. The device of claim 6, wherein said brackets are positioned longitudinally on each of the wall support members.

9. The device of claim 6, wherein when the device is connected to the wall support members, said cross members are generally parallel to the ceiling support member.

10. The device of claim 6, wherein said first cross member is hingedly connected to said first removable support connector at said one end and said second cross member is hingedly connected to said second removable support connector at one end.

\* \* \* \* \*